D. EVANS.
EDUCATIONAL AND LIKE APPLIANCE.
APPLICATION FILED FEB. 5, 1920.

1,369,640. Patented Feb. 22, 1921.

Inventor
D. Evans
By [signature]
Atty.

UNITED STATES PATENT OFFICE.

DANIEL EVANS, OF BARRY DOCK, WALES.

EDUCATIONAL AND LIKE APPLIANCE.

1,369,640.

Specification of Letters Patent.  Patented Feb. 22, 1921.

Application filed February 5, 1920. Serial No. 356,498.

*To all whom it may concern:*

Be it known that I, DANIEL EVANS, a subject of His Majesty the King of England, and resident of Barry Dock, in the county of Glamorgan, Principality of Wales, have invented certain new and useful Improvements in or Relating to Educational and like Appliances, of which the following is a specification.

This invention relates to educational and like appliances.

The invention has for its object to provide improved means for use in teaching and studying geography, physiography or astronomy. Thus, appliances provided by the invention may be used in the production of maps having one or more countries or districts pictorially represented therein in apparent relief.

According to the invention the improved appliance comprises as its primary feature a plate of metal or other suitable substance provided with one or more recesses corresponding to the contour or contours of one or more countries, districts or subjects to be studied, and adapted to be used in conjunction with plastic material for the purpose of the invention, for example, if it be desired to study the geography of England a recess would be formed in the plate to correspond to the contour or outline of that country.

The invention will now be described with reference to the accompanying drawings, in which:—

Figure 1:
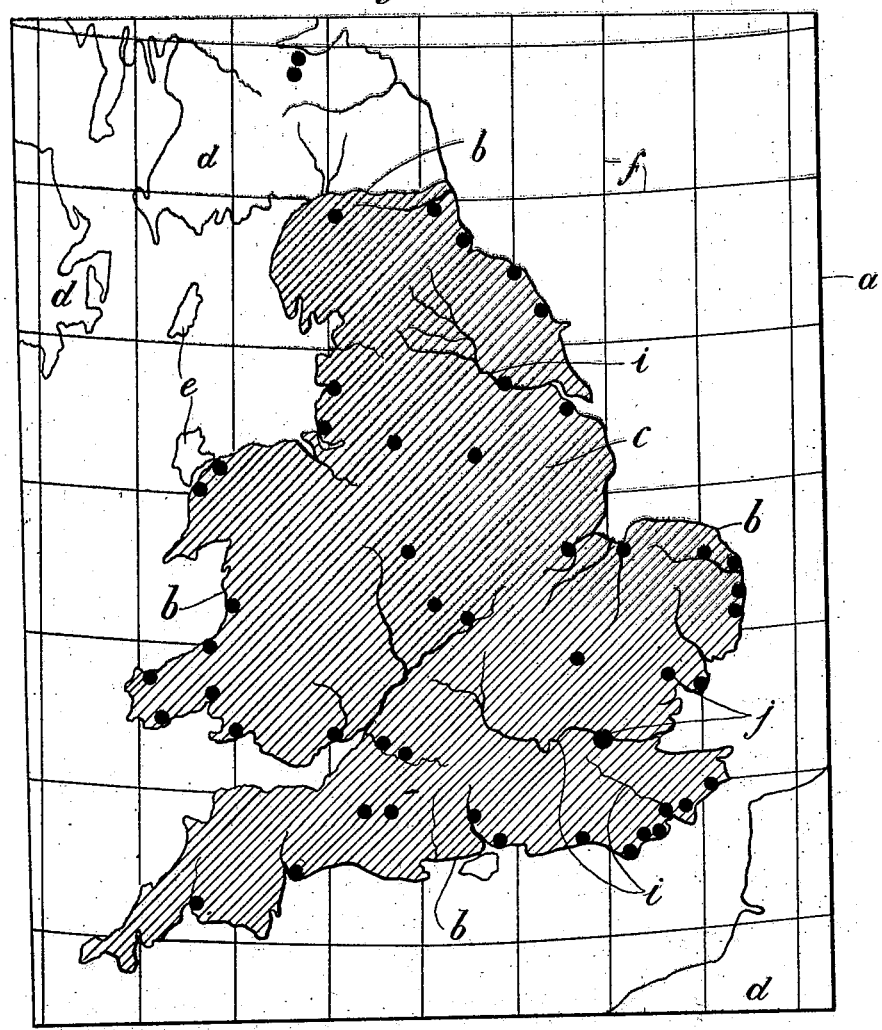
Figure 1 is a plan of a suitable form of plate with the plastic material in position.
Figure 2:
Fig. 2 is a cross sectional elevation of the plate of Fig. 1.

Thus, in carrying out the invention, and referring particularly to Figs. 1 and 2, the plate $a$ is formed with a recess $b$ as distinguished from a hole extending completely through the thickness of said plate, and in one method of using the plate the latter is adapted to be laid upon a table or other suitable support and the recess to be filled, either by the manufacturer or by the person or child using the appliance, with a plastic material $c$ such as clay, or wax, so as to obtain a surface of plastic material the outline or contour of which corresponds to the outline or contour of the recess in the plate and to that of the country to be studied, in this case England. Some of the geographical and physical features of the complete map to be produced and studied, such as the countries $d$, the islands $e$, and the lines of latitude and longitude $f$ may be printed, drawn, painted or otherwise permanently formed on the surface of the plate surrounding the recess $b$, and said surface may be colored at the parts $d$ and $e$ and to represent the sea. The islands and other features of the map may be represented by auxiliary recesses and projections formed in or upon the plate.

Figure 3:
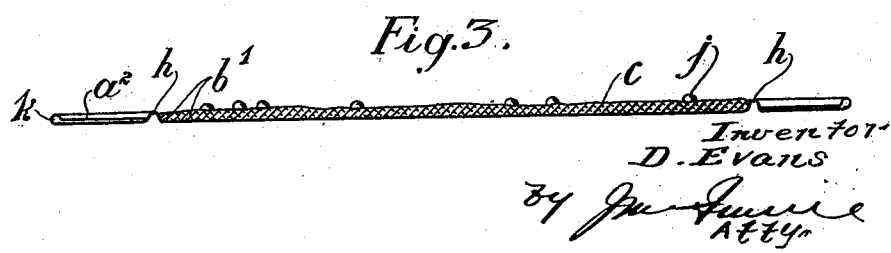
Fig. 3 is a sectional view of a modified form of plate.

In a modified construction the plate $a^2$ Fig. 3 may be formed with one or more recesses as $b'$ surrounded by an upstanding rib or ribs $h$, and said recess or recesses can be adapted to be filled with the plastic material $c$ in the manner described with reference to the plate $a$ of Figs. 1 and 2.

The flat or bottom portions of the plates $a^2$ of Fig. 3 may be treated as described with reference to the plate $a$ of Figs. 1 and 2, that is, colored to represent the sea, the countries $d$ and so on.

Rivers $i'$ may be first drawn or cut on the surface or surfaces of the plastic mass and be thereafter indicated thereon by blue or other colored cord or ribbon inserted into the grooves so made. Lakes can be represented by pieces of glass pressed into the mass $c$. Towns and cities $j$ may be represented by beads pressed into the plastic mass and of different colors, shapes and sizes so as to indicate thereby the populations of the various towns and cities. Railways may be represented by stiffer cords or wires, by ribbons or cords of various colors, or other suitable means.

The plate may be formed in one piece or may be built up in sections, and may be made of metal such as aluminium, brass or tin or of wood, celluloid, bone, ivory, ebonite, horn, cardboard, millboard or papier-mâché, and may be opaque or transparent as desired. Each section of the plate may be colored and fluted or otherwise fashioned, and strengthened with bands or metal strips, and the sections may be of such form that they can be strung on one set of wires and slid thereon to the correct position of latitude and longitude and thereafter pressed into the plastic mass. The edges of the plate $a$, or $a^2$ are preferably beaded at $k$ or otherwise strengthened. The correct position of a town or mountain may be found by means of a ruler, the edges of the plate being graduated in degrees and suitable sub-divisions thereof if so desired. If so desired the plate may also be provided with a scale of miles to the inch or other desired scale and an arrow to indicate north and south. An indication of the name or names of a country or countries or part thereof may also be provided on the plate in any suitable manner.

The appliance on a larger scale may be used in constructing survey and other maps.

What I claim is:—

An educational appliance for use in teaching and studying geography, physiography, or astronomy, comprising a plate formed with a shallow recess, the margin of which is shaped to correspond with the outline of the country or the like to be studied, the edges of the plate beyond the recess being permanently designed to indicate physical conditions in proper relation to and beyond the edge of the country defined by the recess outline.

In testimony whereof I have hereunto signed my name.

DANIEL EVANS.